(12) United States Patent
Kalscheur et al.

(10) Patent No.: US 10,990,805 B2
(45) Date of Patent: Apr. 27, 2021

(54) HYBRID MODE ILLUMINATION FOR FACIAL RECOGNITION AUTHENTICATION

(71) Applicant: Apple Inc., Cupertino, CA (US)

(72) Inventors: Micah P. Kalscheur, San Francisco, CA (US); Joshua M. Susskind, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 16/277,485

(22) Filed: Feb. 15, 2019

(65) Prior Publication Data

US 2020/0082155 A1 Mar. 12, 2020

Related U.S. Application Data

(60) Provisional application No. 62/730,115, filed on Sep. 12, 2018.

(51) Int. Cl.
*G06K 9/00* (2006.01)
*G06F 21/32* (2013.01)
*G06K 9/20* (2006.01)

(52) U.S. Cl.
CPC ......... *G06K 9/00255* (2013.01); *G06F 21/32* (2013.01); *G06K 9/00288* (2013.01); *G06K 9/2036* (2013.01)

(58) Field of Classification Search
CPC ............. G06K 9/00255; G06K 9/2036; G06K 9/00288; G06K 9/2027; G06K 9/2018; G06K 9/6274; G06F 21/32
See application file for complete search history.

(56) References Cited

U.S. PATENT DOCUMENTS

| | | | |
|---|---|---|---|
| 7,961,332 B2 | 6/2011 | Kilpatrick et al. | |
| 9,285,893 B2 | 3/2016 | Holz | |
| 9,612,687 B2 | 4/2017 | Powell et al. | |
| 10,303,866 B1 * | 5/2019 | Van Os | G06K 9/00281 |
| 10,440,294 B1 * | 10/2019 | Wan | H04N 7/18 |
| 2011/0310220 A1 | 12/2011 | McEldowney | |
| 2013/0015946 A1 * | 1/2013 | Lau | G06F 21/32 340/5.2 |
| 2013/0251215 A1 * | 9/2013 | Coons | H04N 5/23219 382/118 |

(Continued)

*Primary Examiner* — Kim Y Vu
*Assistant Examiner* — Molly Delaney
(74) *Attorney, Agent, or Firm* — Kowert, Hood, Munyon, Rankin & Goetzel, P.C.; Gareth M. Sampson

(57) ABSTRACT

A facial recognition authentication process may utilize images of a user's face that are captured while the user is being illuminated using both flood infrared illumination and patterned illumination (e.g., speckle pattern illumination). As the user's face is illuminated by both flood infrared illumination and patterned illumination, the captured images may include both flood infrared illumination data and depth map image data. Flood infrared illumination data may be generated from the images to assess two-dimensional features of the user in the captured images. Depth map image data may be generated from the pattern data in the images to assess three-dimensional (depth) features of the user in the captured images. The flood infrared illumination data and the depth map image data may be used separately by facial recognition authentication process to attempt to authenticate the user in the captured images as an authorized user of the device.

20 Claims, 8 Drawing Sheets

(56) References Cited

U.S. PATENT DOCUMENTS

| | | | |
|---|---|---|---|
| 2013/0343634 A1* | 12/2013 | Xu | G06K 9/36 |
| | | | 382/154 |
| 2015/0154035 A1 | 6/2015 | Zepeniuk et al. | |
| 2015/0341619 A1 | 11/2015 | Meir et al. | |
| 2016/0260223 A1* | 9/2016 | Gren | G06K 9/00604 |
| 2017/0186160 A1* | 6/2017 | Satish | G06K 9/4604 |
| 2017/0195653 A1 | 7/2017 | Trail et al. | |
| 2018/0196998 A1* | 7/2018 | Price | G06K 9/00268 |
| 2018/0218535 A1* | 8/2018 | Ceylan | G06T 7/13 |

* cited by examiner

US 10,990,805 B2

HYBRID MODE ILLUMINATION FOR FACIAL RECOGNITION AUTHENTICATION

PRIORITY CLAIM

This patent claims priority to U.S. Provisional Patent Application No. 62/730,115 to Kalscheur et al., entitled "HYBRID MODE ILLUMINATION FOR FACIAL RECOGNITION AUTHENTICATION", filed Sep. 12, 2018, which is incorporated by reference in their entirety.

BACKGROUND

1. Technical Field

Embodiments described herein relate to methods and systems for operating a facial recognition authentication process on a device. More particularly, embodiments described herein relate to operating a facial recognition authentication process using a combination of flood infrared illumination and patterned illumination of the user attempting to be authenticated by the facial recognition authentication process.

2. Description of Related Art

Facial recognition processes may be used to authenticate users for computer devices having a camera. In facial recognition processes, the user may be illuminated with illumination while images of the user are captured by the camera. In some cases, flood infrared illumination is used to assess two-dimensional information about the user being authenticated. Patterned illumination may be used in facial recognition processes to assess three-dimensional (e.g., "depth map") information about the user being authenticated. Traditionally devices may separately capture images using the different types of illumination to avoid one type of illumination affecting the other type of illumination.

SUMMARY

A user's face may be illuminated with both flood infrared illumination and patterned illumination in images captured by a device (e.g., a mobile device) to be used in a facial recognition authentication process. The flood infrared illumination and patterned illumination may be provided by a single illuminator or a combination of illuminators. Both flood infrared illumination data and depth map image data may be generated from the captured images. Flood infrared illumination data may be generated by assessing areas in the images between features (e.g., speckles) in the illuminated pattern. Depth map image data may be generated by assessing the pattern illuminated on the user's face in the images. The flood infrared illumination data and the depth map image data may be generated separately from the captured images. The facial recognition authentication process may attempt to authenticate the user in the captured images as an authorized user of the device by using the flood infrared illumination data and/or the depth map image data.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
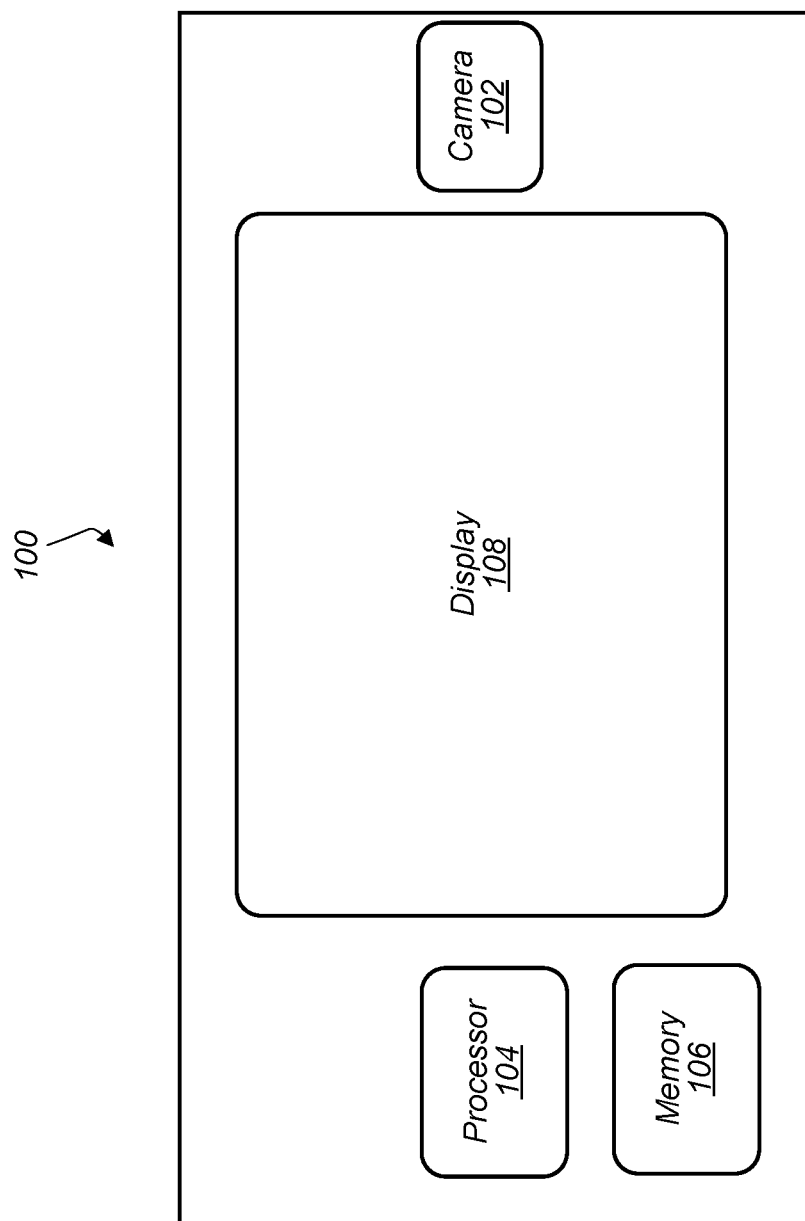
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
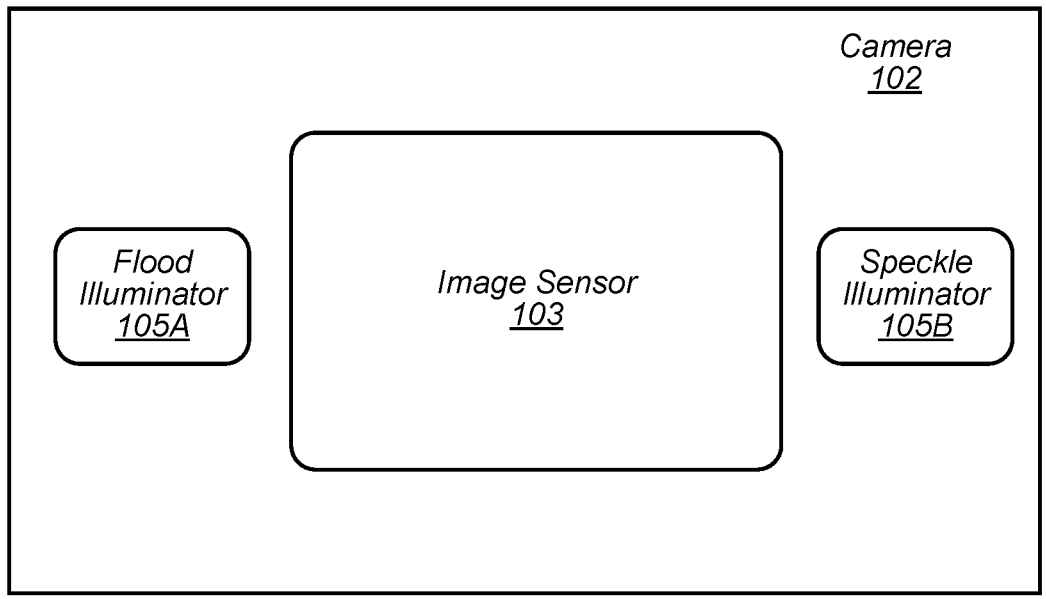
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection and/or facial recognition authentication, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

For depth detection or generating a depth map image, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Examples of providing different speckle pattern densities are described in U.S. patent application Ser. No. 15/912,917 to Gernoth et al., which is incorporated by reference as if fully set forth herein. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In some embodiments, flood IR illumination and patterned IR illumination (e.g., speckle pattern illumination) are provided using a single illuminator. For example, illuminator 105A and illuminator 105B may be a single illuminator. In some embodiments, the single illuminator may provide both flood IR illumination and patterned IR illumination at substantially the same time (e.g., substantially simultaneously). In such embodiments, image sensor 103 may capture images of the subject being simultaneously illuminated by both flood IR illumination and patterned IR illumination from the single illuminator, as described herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
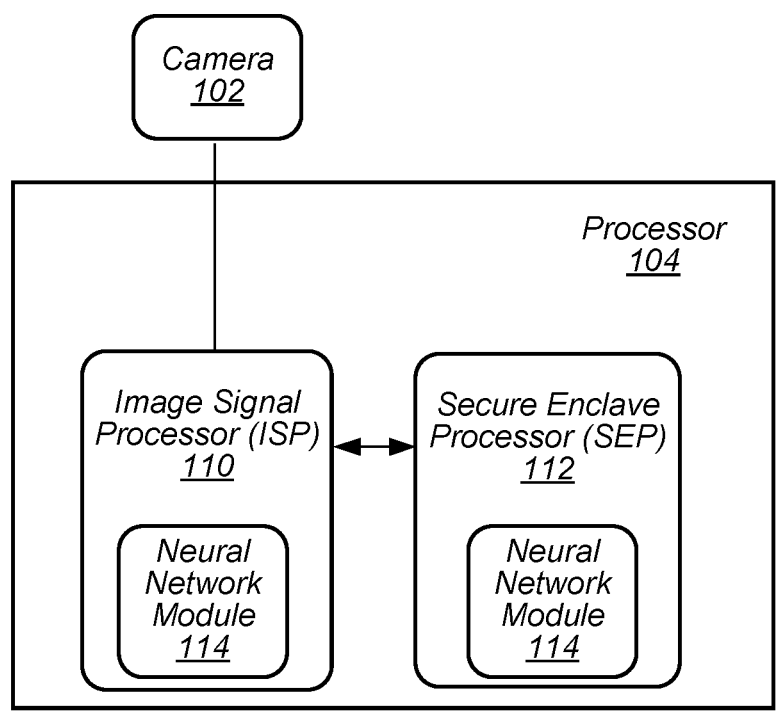
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image and/or depth map image data). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

Figure 4:
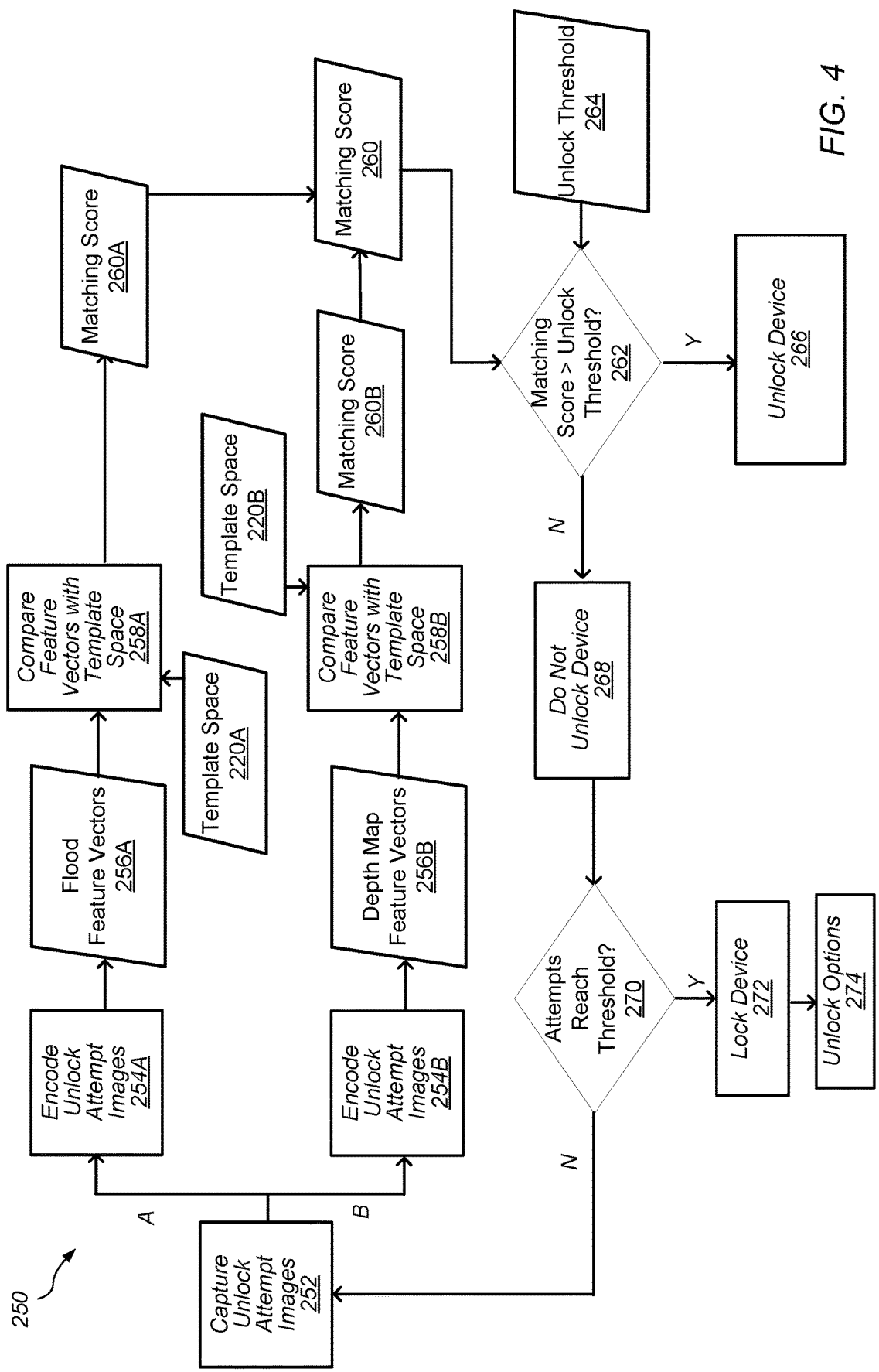
FIG. 4 depicts a flowchart of an embodiment of a facial recognition authentication process.

FIG. 4 depicts a flowchart of an embodiment of facial recognition authentication process 250. Process 250 may be used to authenticate a user as an authorized user of device 100 using facial recognition of the user. In certain embodiments, process 250 is used to authenticate a user using an enrollment profile (e.g., template space 220) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In 252, camera 102 captures images of the face of the user attempting to be authenticated for access to device 100 (e.g., the camera captures "unlock attempt" images of the user). The unlock attempt images captured in 252 may be captured in response to a prompt by the user. For example, the unlock attempt images may be captured when the user attempts to access to device 100 by pressing a button (e.g., a home button or virtual button) on device 100, by moving the device into a selected position relative to the user's face (e.g., the user moves the device such that the camera is pointed directly at the user's face), and/or by making a specific gesture or movement with respect to the device (e.g., tapping on the screen, swiping the user's finger across the display, or picking the device off the table).

Figure 5:
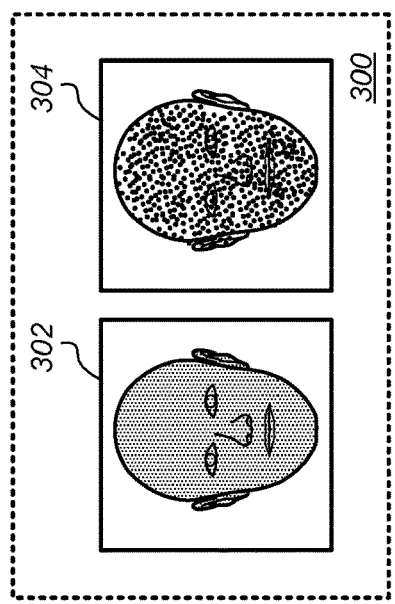
FIG. 5 depicts a representation of an embodiment of a pair of images that includes a flood IR image and a patterned illumination image.

In certain embodiments, the unlock attempt images include a series of several images of the face of the user taken over a short period of time (e.g., one second or less). In some embodiments, the series of several images of the face of the user includes pairs of flood IR images and patterned illumination images (e.g., each consecutive pair of images includes a flood IR and a patterned illumination image). FIG. 5 depicts a representation of an embodiment of a pair of images that includes a flood IR image and a patterned illumination image. In certain embodiments, pair 300 (e.g., the pair of images) includes flood IR image 302 and patterned illumination image 304. Flood IR image 302 may include, as described herein, an image of the user captured when the user is illuminated by flood IR illumination (e.g., illuminated by illuminator 105A, shown in FIG. 2). Patterned illumination image 304 may include, as described herein, an image of the user generated from an image of the user captured when the user is illuminated by patterned illumination (e.g., illuminated by illuminator 105B, shown in FIG. 2). The patterned illumination used to generate patterned illumination image 304 may include any desired pattern density (e.g., dot density), as described herein.

In certain embodiments, flood IR image 302 and patterned illumination image 304 in pair 300 are captured consecutively during a sequence of capturing images (e.g., the flood IR image and the patterned illumination image are captured one after the other in the sequence). For example, as shown in FIG. 5, flood IR image 302 is captured first followed by patterned illumination image 304 in pair 300. The images in a pair of images may, however, be captured in any order desired (e.g., the patterned illumination image may be captured first followed by the flood IR image in a pair of images).

Figure 6:
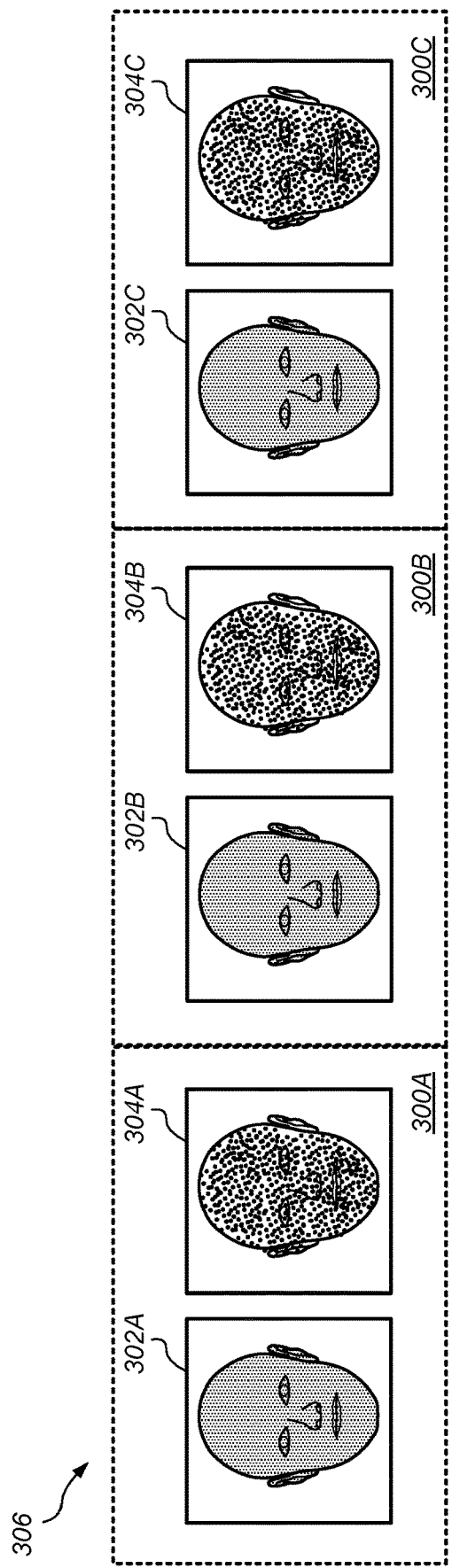
FIG. 6 depicts a representation of an embodiment of a series of several pairs of images.

In certain embodiments, a series of several images includes multiple pairs of images (e.g., multiple pairs 300 of consecutive flood IR images 302 and patterned illumination images 304). FIG. 6 depicts a representation of an embodiment of a series of several pairs of images. In the embodiment depicted in FIG. 6, series 306 includes three pairs of images flood IR images 302 and patterned illumination images 304—pair 300A, pair 300B, and pair 300C. Pairs 300A, 300B, and 300C may be taken consecutively during an image capture sequence on device 100. Images in series 306 may be used in process 250 to authenticate the user in the captured images as an authorized user of device 100 using facial recognition of the user. Using pairs of consecutive flood IR and patterned illumination images in series 306 allows process 250 to assess facial features of the user in flood IR images and patterned illumination images that are consecutively captured (e.g., captured one after the other). The number of pairs in series 306 may vary. For example, series 306 may include three pairs, as shown in FIG. 6, four pairs, five pairs, or any other number of pairs of images desired. The number of pairs in series 306 utilized by process 250 may be determined or varied as desired based on desired operating performance and/or desired security thresholds for device 100. Assessing features of the user in a series of flood IR images and patterned illumination images may increase the accuracy of process 250 in authenticating the user in the captured images as an authorized user of the device.

Using pairs of flood IR images of the user and patterned illumination images in series 306 to authenticate the user may also increase the security of device 100 against spoofing or replay attacks that are attempting to unlock or access the device by deceiving process 250. For example, the order that flood IR image 302 and patterned illumination image 304 are captured in each pair in series 306 may be varied in a pseudo-random sequence in the series (e.g., one pair captures the flood IR image first, another pair captures the patterned illumination image first, etc.). The pseudo-random sequence may then be verified before process 250 proceeds to attempt to authenticate the user using facial recognition. For example, secure enclave processor 112, shown in FIG. 3, may verify the pseudo-random sequence before process 250 proceeds. Examples of security techniques for facial recognition authentication processes are described in U.S. patent application Ser. No. 16/049,933 to Prakash et al. and U.S. patent application Ser. No. 16/050,021 to Prakash et al., which are incorporated by reference as if fully set forth herein.

Figure 7:
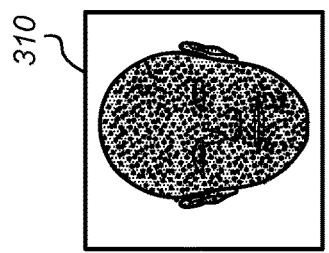
FIG. 7 depicts a representation of an embodiment of a hybrid image.

In certain embodiments, the series of several images of the face of the user captured in 252, shown in FIG. 4, includes a series of "hybrid" images (e.g., an image of a subject illuminated by both the flood IR illumination and patterned illumination (such as speckle pattern illumination)). FIG. 7 depicts a representation of an embodiment of hybrid image 310. In certain embodiments, hybrid image 310 is an image of the user captured when the user is illuminated by both flood IR illumination and patterned illumination (e.g., illuminated simultaneously by both illuminator 105A and illuminator 105B, shown in FIG. 2, or a single illuminator as described herein). Flood IR image data (e.g., information obtained from the flood IR image) for hybrid image 310 may be generated using signal information between features (e.g., speckles or dots) in the captured hybrid image. Depth map image data (e.g., patterned illumination or depth map information) for hybrid image 310 may be generated using data or information from the pattern illuminated on the subject in the captured hybrid image.

While both flood IR data and depth map (patterned illumination) image data are obtained from hybrid image 310, flood IR data may be assessed separately from depth map image data. For example, flood IR data for hybrid image 310 may be parsed (e.g., separated) from depth map image data for the hybrid image. Parsing the flood IR data and depth map image data may allow separate processing of the data in process 250 (similar to separate processing utilized for image pairs of flood IR images and patterned illumination images).

In certain embodiments, the illumination used to illuminate the user with both flood IR illumination and patterned illumination is balanced to provide desired properties in the illumination. For example, the flood IR illumination and patterned illumination may be balanced to maximize signal between features in the pattern (for use in flood IR) while allowing features in the pattern to still be distinguishable (e.g., dots are not washed out by the flood illumination).

Figure 8:
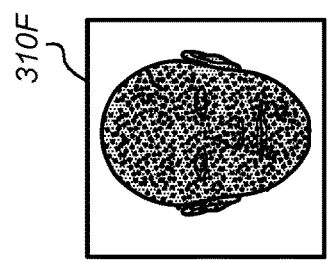
FIG. 8 depicts a representation of an embodiment of a series of hybrid images.
Figure 8:
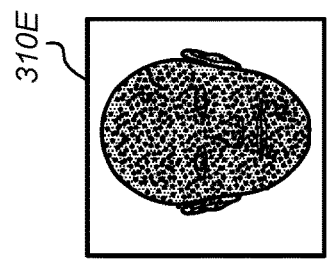
Figure 8:
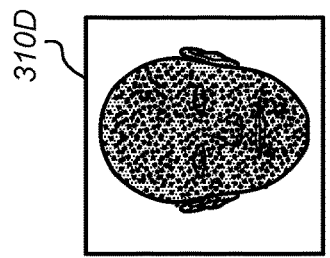
Figure 8:
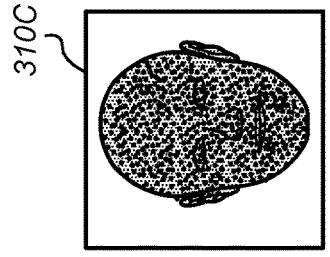
Figure 8:
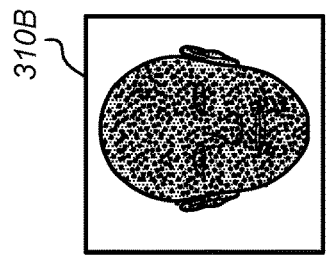
Figure 8:
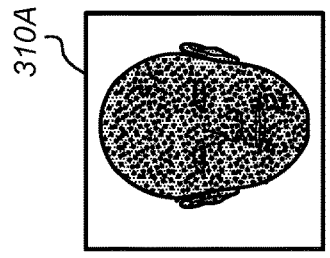

In some embodiments, using a series of hybrid images 310 in process 250 may increase the data available to the process 250. For example, FIG. 8 depicts a representation of an embodiment of a series of hybrid images. In the example, series 306' includes six hybrid images 310A-F. Series 306' includes six data sets (one for each image) for both flood IR image data and depth map image data. Thus, series 306' may provide twice as much image data as series 306, shown in FIG. 6, which includes three data sets each for flood IR image data and depth map image data.

Figure 9:
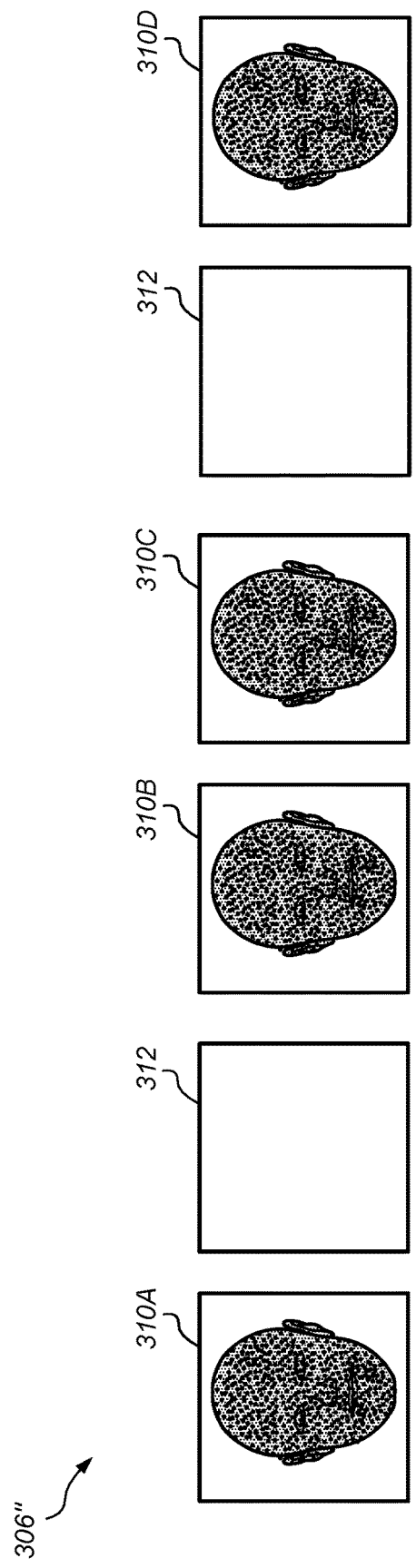
FIG. 9 depicts a representation of an embodiment of a series of hybrid images with empty frames in the series.

In certain embodiments, a series of hybrid images 310 used in process 250 includes captures of one or more empty frames or slots in the series. FIG. 9 depicts a representation of an embodiment of a series of hybrid images with empty frames in the series. Series 306" may include hybrid images 310A-D with one or more empty frames 312 in the series. In certain embodiments, empty frames 312 are generated in series 306" by turning off illumination during the time that frame is being captured. For example, illuminators 105A and 105B may be turned off while image sensor 103 captures an image. Without the illumination being turned on, image sensor 103 may capture the "empty" images shown in FIG. 9.

In certain embodiments, the position of empty frames 312 in series 306" are varied using a pseudo-random sequence. The pseudo-random sequence that hybrid images 310A-D and empty frames 312 are positioned in series 306" may be predetermined. For example, a security circuit (e.g., secure enclave processor 112) may generate (e.g., predetermine) the pseudo-random sequence and provide instructions to camera 102 to capture images with the predetermined pseudo-random sequence. The captured pseudo-random sequence of hybrid images 310A-D and empty frames 312 may then be verified (e.g., verified by secure enclave processor 112) against the predetermined pseudo-random sequence before process 250 proceeds with facial recognition authentication of the user. Providing empty frames 312 in the pseudo-random sequence and verifying the pseudo-random sequence may increase the security of device 100 against spoofing or replay attacks that are attempting to unlock or access the device by deceiving process 250. In certain embodiments, the number of different combinations of hybrid images 310 and empty frames 312 available in series 306" is higher than the number of different combinations available for pairs 300 in series 306, shown in FIG. 6. Thus, varying positions of empty frames 312 in series 306" may provide increased security against spoofing or replay attacks as compared to varying pair sequences in series 306.

In some embodiments using empty frames 312 in series 306", some inadvertent patterned illumination may appear in an empty frame. For example, a second device may be transmitting and have overlapping illumination with device 100 that causes a pattern to appear in empty frame 312. In some embodiments, device 100 operates a verification process for empty frames in series 306" (or any other series of hybrid images).

Figure 10:
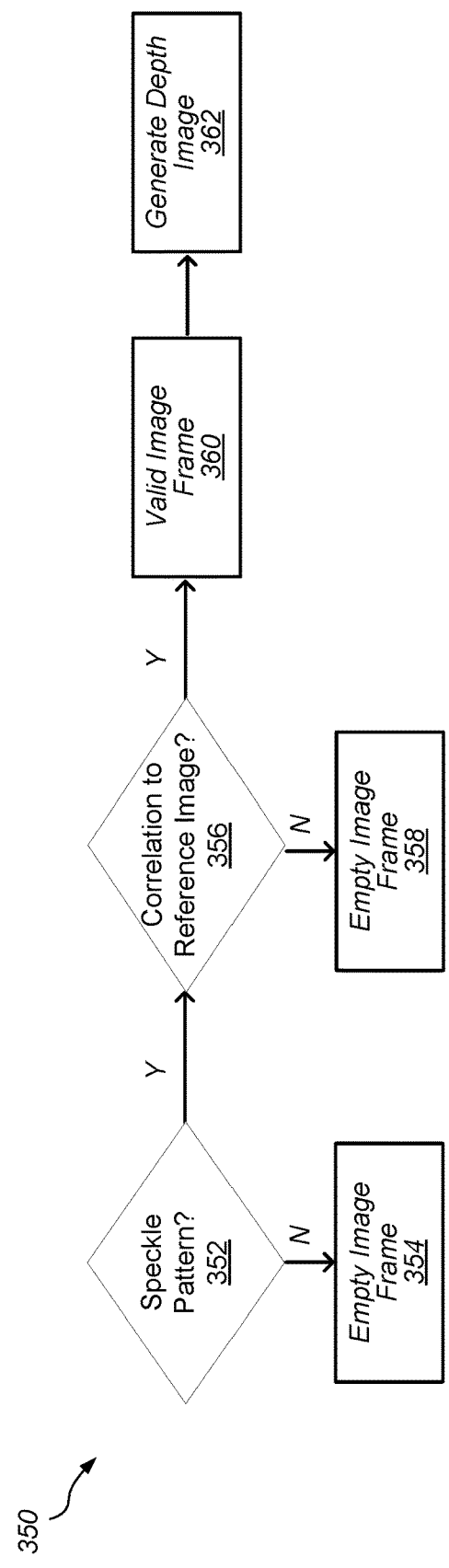
FIG. 10 depicts a flowchart of an embodiment of an empty frame verification process.

FIG. 10 depicts a flowchart of an embodiment of empty frame verification process 350. Process 350 may begin in 352 with assessing (e.g., detecting) if a pattern (e.g., a speckle pattern) is in the captured image frame. If no pattern is assessed in the image frame, then the image frame may be determined to be an empty image frame in 354. If a pattern is assessed in the image frame, then process 350 continues in 356 with assessing if there is a correlation between the captured image frame and reference image data. In certain embodiments, assessing the correlation includes matching the pattern in the captured image to a reference pattern (e.g., matching a speckle pattern in the captured image to a reference speckle pattern). The reference pattern image may be located, for example, in reference calibration files for illumination on device 100. If there is no correlation between the captured image frame and the reference image data, then the image frame may be determined to be an empty image frame in 358.

If there is correlation between the captured image frame and the reference image data, then the captured image is determined to be a valid image frame in 360. In 362, a depth map image may be generated from the valid image frame.

The generated depth map image may be used in the continuation of process 250 or any other suitable process on device 100.

Figure 11:
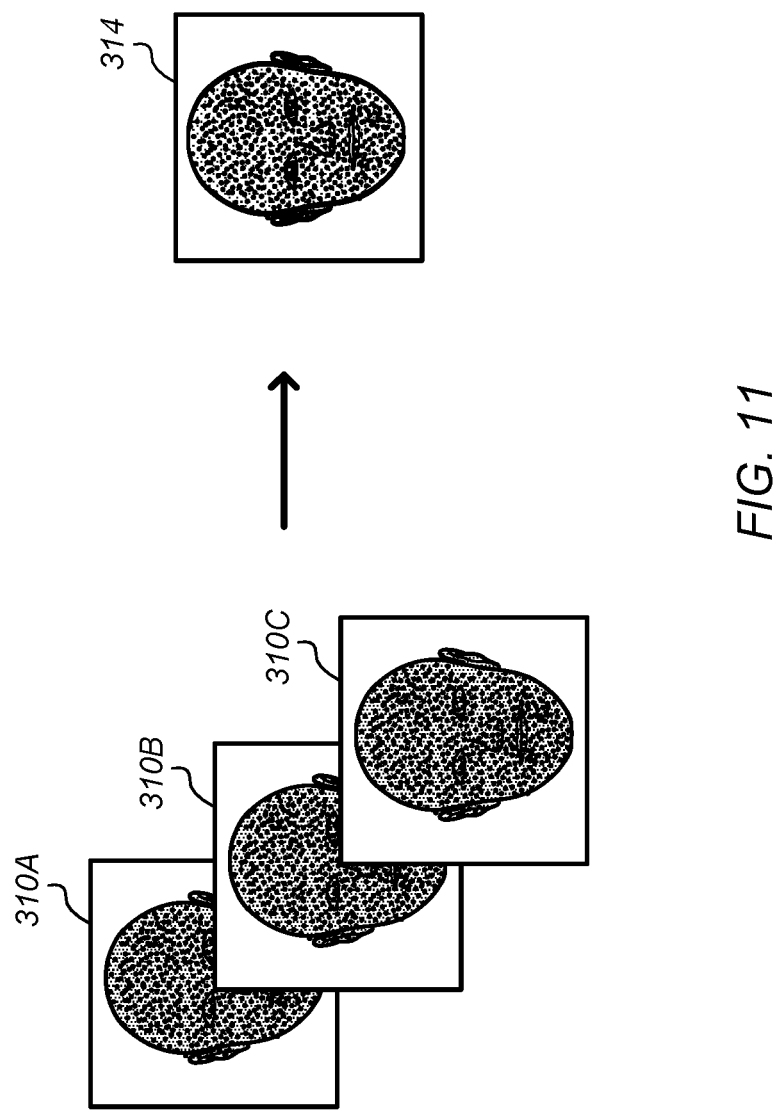
FIG. 11 depicts a representation of an example of an embodiment of combining of hybrid images into a composite image.

In some embodiments, one or more hybrid images 310 (e.g., sets of hybrid images) may be combined to generate a composite hybrid image. FIG. 11 depicts a representation of an example of an embodiment of combining of hybrid images into a composite image. In certain embodiments, three hybrid images (e.g., hybrid images 310A, 310B, 310C) are combined to form composite image 314. Combining other numbers of hybrid images (e.g., two, four, or five hybrid images) may also be possible. The number of hybrid images to combine may be varied based on desired performance for device 100.

In some embodiments, combining hybrid images 310A, 310B, 310C includes combining depth map image data in the images. In such embodiments, composite image 314 may be a composite depth map image for the three hybrid images. Other embodiments may contemplate combining flood IR data in the hybrid images and/or combining both flood IR data and depth map image data in the hybrid images.

In some embodiments, combining hybrid images 310A, 310B, 310C is provided by operating an algorithm on the images. For example, depth map image data in hybrid images 310A, 310B, 310C may be combined using an iterative closest point algorithm to warp frames into each other. Other algorithms for combining data from multiple images into a single, composite image may also be contemplated.

Combining hybrid images 310A, 310B, 310C into composite image 314 may stack signals from the three hybrid images into the single, composite image. Stacking the signals may increase signal-to-noise ratios in composite image 314 as compared to the individual hybrid images. Increasing the signal-to-noise ratios may improve accuracy in assessing features in the images during process 250.

In some embodiments, increasing the signal-to-noise ratios in patterned illumination images generated from hybrid images 310 may be necessary for proper assessment of depth map data. Combining depth map data into composite image 314 may provide better depth precision in the composite image compared to the individual hybrid images. Composite image 314 for depth map data may also have depth holes and/or no-depth occlusions removed from the image with averaging of data from the individual hybrid images. Combining depth map data may also be suitable for cropped hybrid images.

As described above, the unlock attempt images captured in 252, shown in FIG. 4, may include combinations of flood IR images and patterned illumination images (e.g., pairs of flood IR images and patterned illumination images) or hybrid images that include both flood IR data and depth map (e.g., patterned illumination) image data. In certain embodiments, as shown in FIG. 4, flood IR image data from the unlock attempt images captured in 252 is processed in association with a template corresponding to flood IR data (e.g., a template for flood IR enrollment images). Path "A" may be the path for flood IR data in process 250. Depth map image data from the unlock attempt images captured in 252 may be processed in association with a template corresponding to depth map image data (e.g., a template for depth map or patterned illumination enrollment images). Path "B" may be the path for depth map image data in process 250. In embodiments using hybrid images (e.g., hybrid images 310), the image data from the hybrid images may be parsed (e.g., separated) into separate flood IR data and depth map image data, as described herein. The parsed flood IR data and depth map image data may be processed using the different paths (path A and path B, respectively) shown in FIG. 4.

In some embodiments, depth map image data is used in another process associated with process 250. For example, depth map image data may be used in a security process associated with secure enclave processor 112 to assess if the user in the unlock attempt images is an actual person. The security process may be used to prevent spoofing or the use of masks to deceive process 250. Examples of security processes are described in U.S. patent application Ser. No. 16/049,933 to Prakash et al. and U.S. patent application Ser. No. 16/050,021 to Prakash et al.

In 254A, flood IR data in the unlock attempt images is encoded to define flood (e.g., two-dimensional) the facial features of the user as one or more feature vectors in the feature space. Flood feature vectors 256A may be the output of the encoding of the flood IR data in the unlock attempt images in 254A. Similarly, in 254B, depth map image data in the unlock attempt images is encoded to define the depth map (e.g., three-dimensional) facial features of the user as one or more feature vectors in the feature space. Depth map feature vectors 256B may be the output of the encoding of the depth map image data in the unlock attempt images in 254B.

In certain embodiments, in 258A, flood feature vectors 256A are compared to feature vectors in the templates of flood IR template space 220A to get matching score 260A for flood IR data in the unlock attempt images. In 258B, depth map feature vectors 256B may be compared to feature vectors in the templates of depth map template space 220B to get matching score 260B for depth map image data in the unlock attempt images. In certain embodiments, flood IR template space 220A and depth map template space 220B include templates for an enrollment profile for an authorized user on device 100 (e.g., templates generated during the enrollment process described herein). Matching score 260A may be a score of the differences between flood feature vectors 256A and feature vectors in flood IR template space 220A (e.g., flood feature vectors for the authorized user generated during the enrollment process). Matching score 260B may be a score of the differences between depth map feature vectors 256B and feature vectors in depth map template space 220B (e.g., depth map feature vectors for the authorized user generated during the enrollment process). Matching score 260A and/or matching score 260B may be higher when flood feature vectors 256A and/or depth map feature vectors 256B are closer to (e.g., the less distance or less differences) the feature vectors in flood IR template space 220A and/or depth map template space 220B.

In some embodiments, comparing feature vectors and templates from a template space to get a corresponding matching score includes using one or more classifiers or a classification-enabled network to classify and evaluate the differences between the generated feature vectors and feature vectors from the template space. Examples of different classifiers that may be used include, but are not limited to, linear, piecewise linear, nonlinear classifiers, support vector machines, and neural network classifiers. In some embodiments, matching score 260A and/or matching score 260B are assessed using distance scores between feature vectors (e.g., feature vectors 256A or feature vectors 256B) and templates from the template space (e.g., template space 220A or template space 220B, respectively).

In certain embodiments, matching score 260A and matching score 260B are combined to generated matching score 260. In some embodiments, matching score 260A and matching score 260B may be averaged to generate matching score 260 (e.g., each matching score 260A and 260B provides 50% of matching score 260). In some embodiments, matching score 260A is weighted to provide more contribution to matching score 260. In some embodiments, matching score 260A may be used as matching score 260. For example, matching score 260A may be used as matching score 260 if matching score 260A is above a threshold that provides a high confidence of matching between the user in the unlock attempt images and the authorized (e.g., enrolled) user.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., the templates in flood IR template space 220A and/or depth map template space 220B). In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 4, in 262, if matching score 260 is above unlock threshold 264 (i.e., the user's face in the unlock attempt image substantially matches the face of the authorized user), the user in the unlock attempt image is authenticated as the authorized user for the enrollment profile on device 100 and the device is unlocked in 266. In certain embodiments, unlocking device 100 in 266 includes allowing the user to access and use the device (e.g., unlock the device) and/or allowing the user to have access to a selected functionality of the device (e.g., unlocking a function of an application running on the device, payment systems (i.e., making a payment), access to personal data, expanded view of notifications, etc.).

In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may include using another authentication protocol to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device.

If the unlock attempts are below the threshold in 270 (e.g., number of unlock attempts are below the maximum number of attempts allowed), then process 250 may be run again (re-initiated) beginning with a new unlock attempt image of the user being captured in 252. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 250 is being re-initiated. In some embodiments, device 100 may prompt the user to provide input to re-initiate process 250. For example, the user may be prompted to acknowledge or otherwise confirm (either visually and/or audibly) the attempt to re-initiate process 250.

In certain embodiments, one or more process steps described herein may be performed by one or more processors (e.g., a computer processor) executing instructions stored on a non-transitory computer-readable medium. For example, process 250, shown in FIG. 4, may have one or more steps performed by one or more processors executing instructions stored as program instructions in a computer readable storage medium (e.g., a non-transitory computer readable storage medium).

Figure 12:
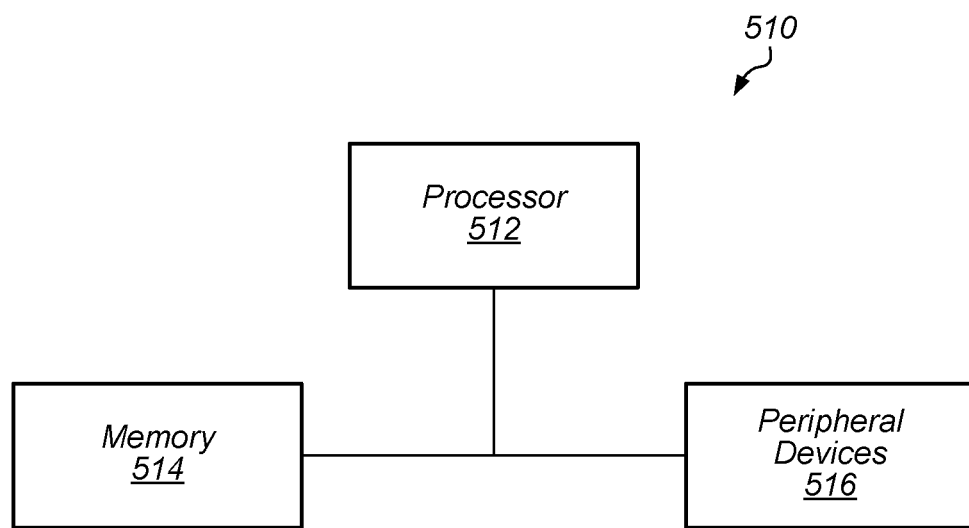
FIG. 12 depicts a block diagram of one embodiment of an exemplary computer system.

FIG. 12 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 250, shown in FIG. 4. In the embodiment of FIG. 12, computer system 510 includes processor 512, memory 514, and various peripheral devices 516. Processor 512 is coupled to memory 514 and peripheral devices 516. Processor 512 is configured to execute instructions, including the instructions for process 250, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 13:
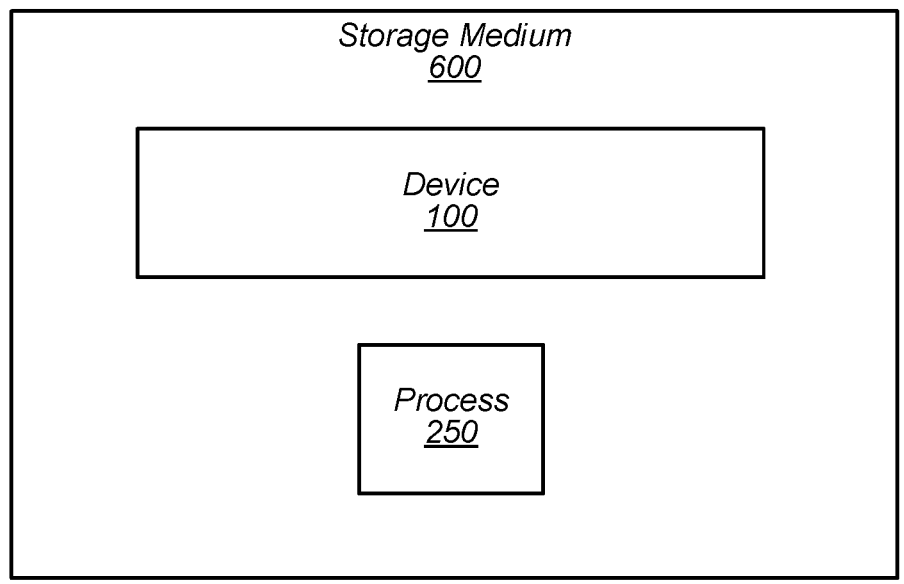
FIG. 13 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 13, other input/output (I/O) devices such as video hardware, audio hardware, user interface devices, networking hardware, etc.).

Turning now to FIG. 13, a block diagram of one embodiment of computer accessible storage medium 600 including one or more data structures representative of device 100 (depicted in FIG. 1) included in an integrated circuit design and one or more code sequences representative of process 250 (shown in FIG. 4). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
   receiving, on a user interface associated with a device comprising a computer processor and a memory, an unlock request for the device from a user;
   in response to receiving the unlock request, illuminating the user with both flood infrared illumination and patterned infrared illumination;
   capturing at least two images of the user using a camera located on the device while the user is being illuminated with both the flood infrared illumination and the patterned infrared illumination;
   generating flood infrared image data from the at least two images;
   combining the at least two images into a composite image, generating depth map image data from the composite image; and
   authorizing the user to perform at least one operation on the device that requires authentication using a facial recognition authentication process operating on the flood infrared image data and the depth map image data.

2. The method of claim 1, wherein the flood infrared image data is generated from image data in areas of the at least two images between features in the patterned infrared illumination.

3. The method of claim 1, wherein the depth map image data is generated by assessing a pattern on the user resulting from the patterned illumination of the user.

4. The method of claim 1, wherein the flood infrared image data is generated separately from the depth map image data.

5. The method of claim 1, wherein the at least two images comprise images of a face of the user.

6. The method of claim 1, wherein the facial recognition authentication process comprises:
   encoding the flood infrared data to generate at least one flood feature vector, wherein the flood feature vector represents one or more flood infrared facial features of the user in the composite image;
   encoding the depth map image data to generate at least one depth map feature vector, wherein the depth map feature vector represents one or more depth map infrared facial features of the user in the composite image;
   comparing the flood feature vector to one or more flood reference templates stored in the memory of the device to obtain a first matching score;
   comparing the depth map feature vector to one or more depth map reference templates stored in the memory of the device to obtain a second matching score;
   assessing a third matching score from the first matching score and the second matching score; and
   authorizing the user to perform the at least one operation on the device that requires authentication in response to the third matching score being above an unlock threshold.

7. The method of claim 6, wherein the third matching score is an average of the first matching score and the second matching score.

8. The method of claim 1, wherein the user is being illuminated simultaneously with both the flood infrared illumination and the patterned infrared illumination while the at least two images are captured by the camera.

9. A device, comprising:
a computer processor;
a memory;
a camera;
a user interface coupled to the computer processor;
at least one illuminator configured to provide flood infrared illumination and patterned infrared illumination;
circuitry coupled to the camera and the illuminator, wherein the circuitry is configured to:
receive, on the user interface, an unlock request for the device from a user;
in response to receiving the unlock request, illuminate the user with both flood infrared illumination and patterned infrared illumination from the at least one illuminator;
capture a series of images of the user using the camera, wherein at least some images in the series of images are captured while the user is being illuminated with both the flood infrared illumination and the patterned infrared illumination from the at least one illuminator, and wherein at least one image in the series of images is captured while the user is not being illuminated by the at least one illuminator;
generate flood infrared image data from the captured images; and
generate depth map image data from the captured images; and
authorize the user to perform at least one operation on the device that requires authentication using a facial recognition authentication process operating on the flood infrared image data and the depth map image data.

10. The device of claim 9, wherein the at least one illuminator comprises a first illuminator and a second illuminator, wherein the first illuminator is a flood infrared illuminator and the second illuminator is a patterned infrared illuminator.

11. The device of claim 9, wherein the at least one illuminator comprises a single illuminator that provides both flood infrared illumination and patterned infrared illumination.

12. The device of claim 9, wherein the user interface is a display of the device.

13. The device of claim 9, wherein the circuitry is configured to parse image data in the captured images to generate the flood infrared image data separate from the depth map image data.

14. The device of claim 9, wherein the captured images comprise images of a face of the user.

15. A method, comprising:
receiving, on a user interface associated with a device comprising a computer processor and a memory, an unlock request for the device from a user;
in response to receiving the unlock request, capturing a series of images of the user using a camera located on the device, wherein at least one of the images in the series is captured while the user is being illuminated with both flood infrared illumination and patterned infrared illumination provided by at least one illuminator on the device, and wherein at least one of the images in the series is captured while the user is not being illuminated by the at least one illuminator;
wherein the series of images comprises a pseudo-random sequence of images captured while the user is being illuminated by the at least one illuminator and images captured while the user is not being illuminated by the at least one illuminator;
comparing the pseudo-random sequence of the captured images in the series to a predetermined pseudo-random sequence for the series generated by the device; and
operating a facial recognition authentication process in response to the pseudo-random sequence of the captured images in the series being determined to be the same as the predetermined pseudo-random sequence, wherein the facial recognition authentication process operates to authorize the user to perform at least one operation on the device that requires authentication.

16. The method of claim 15, wherein the predetermined pseudo-random sequence is generated by a secure enclave processor on the device.

17. The method of claim 15, wherein comparing the pseudo-random sequence of the captured images in the series to the predetermined pseudo-random sequence for the series is performed by a secure enclave processor on the device.

18. The method of claim 15, further comprising generating separate flood infrared image data and depth map image data from one or more of the captured images, and using at least the generated flood infrared image data in the facial recognition authentication process.

19. The device of claim 9, wherein the circuitry is configured to:
generate at least one flood feature vector from the flood infrared image data;
generate at least one depth map feature vector from the depth map image data;
compare the at least one flood feature vector to one or more flood reference templates stored in the memory of the device to obtain a first matching score;
compare the at least one depth map feature vector to one or more depth map reference templates stored in the memory of the device to obtain a second matching score;
determine a third matching score based on the first matching score and the second matching score; and
authorize the user to perform the at least one operation on the device that requires authentication in response to the third matching score being above an unlock threshold.

20. The device of claim 9, wherein the circuitry is configured to generate the flood infrared image data from image data in areas of the captured images that are between features in the patterned infrared illumination.

* * * * *